United States Patent [19]

Conan et al.

[11] 4,157,313

[45] Jun. 5, 1979

[54] COMPOSITE SUPPORT NOTABLY FOR SUPPORTING CATALYSTS CONTAINING A METAL

[75] Inventors: Jean Conan, Gelos; Marie-France Llauro née Darricades, Rillieux; Michel Bartholin, Villeurbanne; Alain Guyot, Lyons, all of France

[73] Assignee: Agence Nationale de Valorisation de la Recherche, Neuilly-sur-Seine, France

[21] Appl. No.: 857,536

[22] Filed: Dec. 2, 1977

Related U.S. Application Data

[63] Continuation of Ser. No. 661,213, Feb. 25, 1976, abandoned.

[30] Foreign Application Priority Data

Feb. 26, 1975 [FR] France .................. 75 06057

[51] Int. Cl.² .............. B01J 31/16; B01J 31/18; B01J 31/24
[52] U.S. Cl. .................. 252/431 P; 252/428; 252/429 R; 252/430; 260/604 HF; 585/269; 585/270; 585/276; 585/277
[58] Field of Search ............... 252/430, 429 R, 428, 252/431 P

[56] References Cited

U.S. PATENT DOCUMENTS

| | | | |
|---|---|---|---|
| 3,652,678 | 3/1972 | Allum et al. | 252/431 P X |
| 3,726,809 | 4/1973 | Allum et al. | 252/431 P |
| 3,832,404 | 8/1974 | Allum et al. | 252/431 P X |
| 3,847,997 | 11/1974 | Allen | 252/431 P X |
| 3,898,176 | 8/1975 | Schmidhammer et al. | 252/430 X |
| 3,907,852 | 9/1975 | Oswald et al. | 252/429 R X |
| 3,956,179 | 5/1976 | Sebestian et al. | 252/428 X |
| 4,086,409 | 4/1978 | Karol et al. | 252/430 |

OTHER PUBLICATIONS

Lapporte et al., J. Org. Chem. 28, (Jul., 1963), pp. 1947-1948.

*Primary Examiner*—Patrick Garvin
*Attorney, Agent, or Firm*—Sprung, Felfe, Horn, Lynch & Kramer

[57] ABSTRACT

Composite product, useful notably as a catalyst, comprising a coordination complex of a metal, notably of a transition metal, fixed to a support, wherein this support is formed of a solid mineral material, insoluble in organic solvets, and is covered at least partly by a polysiloxane, on which the coordinates of these complexes are grafted. This catalyst is stable in gaseous as well as in liquid media, and is useful for the hydrogenation of olefins in homogeneous and heterogeneous phases as well.

17 Claims, No Drawings

COMPOSITE SUPPORT NOTABLY FOR SUPPORTING CATALYSTS CONTAINING A METAL

This is a continuation, of application Ser. No. 661,213 now abandoned, filed Feb. 25, 1976.

The invention relates to composite products, having notably catalytic properties. These products comprise a complex coordinate group of a transition metal, bound to a compound of the polysiloxane type. Since catalysis represents, until now, the most interesting industrial application of these products, the latter will be referred to in the following description by the expression "catalysts". The invention also relates to methods for the preparation of these catalysts and their applications to catalysis, notably in hydrogenation reactions.

Catalysis by transition metal coordination complexes is a technique well known in its principle. Its industrial use however runs up against considerable difficulties connected with the cost of these catalysts. In fact, by reason of their solubility, these catalysts cannot be recovered for subsequent reuse.

The insolubilisation of these metal complexes would seem to offer the solution adapted to the problem of recovery of the catalytic charge. In fact, supported by an insoluble phase, these catalysts become similar in form to conventional heterogenous catalysts, with the advantages that this brings as regards methods of utilisation.

To obtain these results, it has already been proposed to use a mineral support, preferably porous, impregnated with a homogeneous solution of the catalytic complex. This type of supported catalyst can only be used for reactions in the gaseous phase. In fact, used for reactions in the liquid phase, the catalyst may be extracted or entrained by the reaction medium. It has also been proposed to "graft" coordinates of these complexes directly to the mineral support by techniques of the type known as "oiling" in the textile industry. The bond between the complex and the mineral support does not offer in this case all the guarantees of thermal and hydrolytic stability required for industrial use.

It is also known to graft the transition metal coordination complexes onto organic compounds of the type used as a base of ion exchange resins notably styrene-vinylbenzene copolymers. The substrate in this case undergoes firstly a metallation or chloromethylation reaction to enable the subsequent fixing of complex coordinates. The catalysts thus prepared have considerable drawbacks which are the defect of thermal stability on the one hand, and on the other hand, inadequate mechanical properties for the conditions which are found in operations on the industrial scale.

It is an object of the invention to eliminate at least partly the difficulties arising from the use of catalysts based on transition metal coordination complexes known in the prior art. The present invention therefore proposes to provide catalysts and methods for the preparation of the latter, which catalysts enable the carrying-out of operations in the homogeneous or heterogeneous phase and which in the second case are stable in gaseous media as well as in liquid media and withstand mechanical and thermal stresses.

The catalyst according to the invention is constituted by a coordination complex of a metal, notably of a transition metal, fixed to a support by means of coordinate linkages, this catalyst being characterised in that this support is formed of a solid and insoluble mineral material covered at least in part by a polysiloxane on to which the coordinates are grafted.

It is to be understood, in the foregoing, that the term "polysiloxane" is to be taken in its most general sense, that is to say that it denotes polymers which contain recurrent SiO groups, certain at least of the available linkages of the silicon atoms being occupied by organic groups, notably aromatic groups. The polysiloxanes utilised to produce the catalysts according to the invention may have a certain diversity of structure. In particular, their average molecular weight may vary very widely from some thousands to several millions, and are situated preferably between about 20,000 and 500,000.

In the same way, the name "coordinates" is applied here to the groups fixed on the polysiloxane and which, in this condition, are engaged, by means of coordinate linkages in the coordinate complexes proper with the metallic atoms.

Preferably, the polysiloxane is a polyphenylsiloxane, and the coordinate groups are substituents of the phenyl nuclei of the polyphenylsiloxane.

The solid and insoluble material constituting the support on which the polysiloxane is fixed must naturally be inert with respect to the reaction media, within which the catalysts according to the invention are required to be used. In addition, this material is preferably of the type which is capable of being bonded chemically with the polysiloxane, by means of notably silanol groups borne by said polysiloxanes or by siloxanes from which these polysiloxanes have been formed. Thus this is the case for mineral materials bearing, for example, hydroxy groups or which can be brought to states in which they carry them. Preferred materials are constituted in the first place by silica, by silica-based glasses, notably in the form of glass fiber, or silica derivatives. It is also advantageously possible to resort to silico-aluminates or to alumina itself.

Although the nature of the linkage established between the support and the polysiloxane is not precisely known, it is observed that the composite products of this type have both good resistance to extraction or to hydrolysis in liquid media as well as excellent thermal and mechanical stability. The coordinates applied in the catalysts according to the invention may be of a very varied nature. They are, for example, constituted by an amine, carbonyl, cyano, halogeno, dienyl, or cyclodienyl group, and generally any group capable of being fixed to a polysiloxane, notably by means of covalent linkages, and capable of establishing a coordinate bond with a transition metal. Advantageously, however, recourse is had to groups of the arsine, stibine or preferably phosphine type.

The invention can apply one of the metals of the transition series, known for their catalytic properties, and in particular to transition metals of the IV, V, VI, VII and VIII groups of the periodic table. For example, and of course in non-limiting manner, this metal may be constituted by nickel, titanium, rhodium, ruthenium or palladium.

The catalysts thus obtained combine all the advantages of previously known supported catalysts, that is to say the dimensional and thermal stability of supported catalysts, of which the support is constituted by silica or the like, and reactivity and compatability with liquid media used in homogeneous catalysis of known supported catalysts, whose support is constituted by organic polymers, notably of the styrene polymer type, without however including also the drawbacks of these two known groups of catalysts.

The invention includes also a method of manufacturing these new catalysts, which method is characterised in that: polymerisation of a siloxane or of a prepolymer of siloxane in a liquid phase and in the presence of solid and insoluble material which will subsequently constitute the skeleton of the supported catalysts according to the invention is carried out;

the fixing on the polysiloxane portions of the double supports thus obtained is effected, of groups which, later, will form coordinates engaged in the coordinate complexes which will be formed with the metal concerned, and, finally, the selected transition metal is fixed on the last groups mentioned.

The polymerisation of the siloxanes or of the prepolymers of siloxane may be conducted under conditions which have been described in the thesis submitted 29 October 1971 by Claude JANIN to Claude Bernard University of Lyon (order number: 63).

It is recalled that the starting material may be obtained by hydrolysis of a halogenosilane, such as phenyltrichloro-silane, with an excess of water in the midst of a solvent. According as operation is in a neutral medium or in an alkaline medium, there will be obtained a predominance of cyclolinear condensed products, notably of prepolymers with a ladder structure possessing a double silicone chain surrounded by benzene nuclei, or condensates with a closed structure such as octaphenylhexacyclosilsesquioxane, known by the designation T8.

These two types of polysiloxanes correspond respectively to the following formulae.

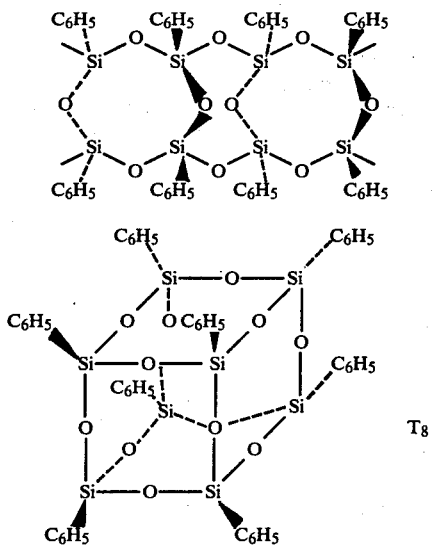

Preferably, the hydrolysis is conducted in a neutral medium to obtain predominantly the ladder-type prepolymer. The subsequent polymerisation is carried out at a temperature comprised between about 200° and 300° C., preferably in the absence of an alkaline catalysts. If necessary, the rise in temperature is regulated so as to ensure that a sufficient number of silanol groups of the initial prepolymer is engaged in the fixing bonds of the polysiloxane on to the mineral support, preferably silica, the temperature being then brought to a higher value to achieve the polymerisation and crosslinking of the polysiloxane. It is possible, for example, to provide a first rise in temperature up to about 200° C., which temperature is maintained for about one hour, then a second rise to about 270° C., which will also be maintained for about one to two hours. If necessary, an intermediate stage at substantially constant temperature is provided in the course of the above said first rise, to remove the reaction solvent if any.

The polymerisation may be carried out in any manner known in itself, notably in the midst of a solvent such as "DOW-THERM", which is constituted by the azeotropic mixture of diphenyl and diphenyl oxide.

Preferably, recourse is had to the starting material constituted by prepolymers in which ladder polycondensates predominate, by reason of their solubility in solvents, such as benzene, toluene, chloroform, tetrahydrofurane, "DOW-THERM", etc. Preferably, the prepolymers have a molecular weight of the order of about 3,000. It is possible to resort also to condensates with a closed structure, although insoluble in the above-indicated solvents. The closed structure of these condensates may however be opened, and the corresponding compound solubilised, in the presence of an excess of alkaline ions.

Preferably, the polymerisation is effected in the absence of an alkaline catalyst (or indeed the latter is eliminated during the condensation). The polymer formed is scarcely soluble in the solvent. It has been observed that, under these conditions, better fixing of the polyphenylsiloxane on the mineral support is obtained. Polymerisation in the presence of alkaline ions, sodium or potassium for example, can nonetheless be effected also. The polymer obtained is then soluble in the solvent, which renders fixing on the mineral material serving as support, more difficult.

Preferably, an excess by weight of the mineral support material is used with respect to the siloxane prepolymer to keep the initial individualised state of the support particles such as the silica grains. It is clear that an excess of siloxane prepolymer could result in a solidification of the polymer which would then form a coating matrix for the support particles. Advantageously, recourse is had to relative proportions of about 1 to about 100 parts by weight of siloxane prepolymer per 100 parts by weight of support.

The proportion of polysiloxane fixed on the grains of silica is advantageously of the order of 50 parts by weight of polysiloxane per 100 parts of silica. Under these conditions, ultramicroscopic observation shows the polymer forms at the surface of the mineral support of the individualised agregates leaving bare a part of the surface of said support.

Generally, the mineral particles which will constitute the skeleton of the supported catalysts according to the invention, are impregnated with a solution of the initial polycondensate. The impregnated mineral support is then heated to a temperature enabling elimination of the solvent, the coated particles of polycondensate being then able to undergo the heat treatment which has been described above. It is possible naturally to have recourse to prepolymers or condensates with a closed structure, for example of the T8 type mentioned above, although the application of these condensates is difficult, by reason of their insolubility in the above-mentioned solvents. It is possible however to overcome this drawback, by using an excess of alkaline ions, this requiring a subsequent elimination of these alkaline ions at a given stage in the manufacture, notably by treatment with acetic anhydride.

In accordance with a preferred method of applying the following step of the process according to the invention (fixing of the groups which, subsequently, will form the coordinates of the catalyst according to the invention), the fixing is effected, on the polysiloxane of the double support obtained at the end of the preceding step (polysiloxane - mineral material), of labile halogen-bearing groups, such as chloromethyl or bromomethyl groups or the like, and the double supports thus modified are made to react with compounds adapted to give these coordinates, for example arsine or stibine groups or, preferably, phosphine groups with an alkali metal, notably lithium or the like.

The fixing of the labile halogen-bearing groups is obtained, for example, by chloromethylation of the phenyl groups, of a polyphenylsiloxane fixed on the mineral support, under known conditions, preferably by means of chloromethyl ether $CH_3-C-CH_2Cl$, in the midst of a chlorinated solvent, such as chloroform (the chloromethyl ether being itself able to constitute the solvent) in the presence of a Lewis acid catalyst, such as stannic chloride or zinc chloride, preferably at a temperature comprised between about 20° C. and about 100° C., for example of the order of 60° C. The reaction may be interrupted at the desired time, notably by deactivation of the catalyst, for example by the introduction, into the medium, of an alcohol such as methanol, which also results in the precipitation of the polymer which may be collected from the reaction medium. The degree of chloromethylation of the polyphenylsiloxane depends both on the polymer and the conditions of the condensation reaction, and can reach the value of one chloromethyl group per two aromatic nuclei.

The above-mentioned technique of chloromethylation is easily applicable to ladder siloxanes or to highly cross-linked polysiloxanes. Applied to single chain polysiloxanes, for example to silicones, they result however in the destruction of the polymer. This is not the case when recourse is had to a gentler technique of chloromethylation utilising chloromethyldimethylchlorosilane. Thus it would enable, for example, according to a modification of the invention, chloromethylation of double support obtained by fixing on glass of the silicone obtained by polymerisation of methylphenyisiloxane$\alpha,\omega$-disilanol one of the OH functions at the end of the chain being utilised for fixing this silicone on glass and the other silanol group being utilised in fixing to the end of the corresponding chain, a chloromethyldimethyl-silane group.

The structure of the product obtained can be represented diagrammatically in the following manner: (mineral support)-(polysiloxane) (substituent possessing a labile halogen).

Whatever the method of chloromethylation used, it is then possible to effect the fixing of a group for forming then a coordinate (by coordinate linkage with a metallic atom) by the reaction of a derivative of this group capable of reacting with the siloxane bearing labile halogen groups. The derivative concerned is advantageously constituted by an organo-alkali derivative of this group. For example in the case where the coordinate group which must be fixed on the polysiloxane is constituted by phosphine, recourse will be had to the reactant constituted by the phosphine-lithium of the formula $P(C_6H_5)_2Li$. This reaction is effected, for example, in the midst of a solvent, such as benzene. The product obtained will finally carry $P(C_6H_5)_2$ groups.

Fixing of the metal can then be carried out, notably by utilising the double carrier support of the groups which will give rise to the formation of the coordinates, in the presence of the soluble coordination complex of the transition metal which is desired to fix on the support, in the midst of a solvent, for a sufficient time to establish equilibrium between the coordinates of the soluble complex and those to which the above-said groups give rise. This reaction therefore brings into play the principles of exchange or displacement of the coordinates to which the transition metal soluble coordinate complexes give rise, when brought into the presence of complementary coordinates. If K denotes the coordinates of the soluble complex, a supported catalyst is finally obtained which can be represented diagrammatically by the following formula: (mineral support)-(polyphenylsiloxane) $(K_nM_mL_y)$ in which M represents the transition metal, K the coordinate derived from the group previously fixed on the polysiloxane and L the coordinate arrising from the soluble complex, n, m and y occurring in ratios which are derived from the coordination numbers of the metal entering into the complex.

One example of this equilibrium reaction is given below by way of non-limiting example, for the sole purpose of illustrating the bringing into competition of two coordinate types, specifically, the phosphine coordinates borne by the support and the coordinates of the Wilkinson complex (rhodium complex). In the equilibrium equation which follows, the support is denoted by the letter Q:

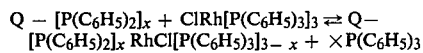

$$Q - [P(C_6H_5)_2]_x + ClRh[P(C_6H_5)_3]_3 \rightleftarrows Q-[P(C_6H_5)_2]_x RhCl[P(C_6H_5)_3]_{3-x} + \times P(C_6H_5)_3$$

in which x corresponds to the number of coordinates exchanged.

The invention also relates to catalyst supports such as described above, before or after the introduction of the group, which, later, will be applied in the equilibrium reactions which have been described in order to form the desired coordination complexes.

The invention also relates, more generally, to supported catalyst whose support is constituted by a polysiloxane of the type described above, taken alone, the coordination complex being then fixed on this support under the same conditions as those which have been indicated with regard to the supported catalysts whose support is constituted by the composite product (mineral support) (polysiloxane). In other words, this supported catalyst comprises metallic atoms, notably a transition metal, bonded to a support by means of coordination linkages, characterised in that the support is constituted by a polysiloxane, preferably a "ladder" polyphenylsiloxane, or a crosslinked polyphenylsiloxane, this polysiloxane being a bearer of coordination groups, by means of which the above-said metallic atoms are bound to this polysiloxane.

The supported catalyst according to the invention are extremely active as is borne out by the tests in the description which is given in the examples which follow. In fact, these examples relate to the application of such supported catalysts (based on rhodium complexes) to the hydrogenation of olefines. A comparison of the reactions of these supported catalysts with an unsupported catalyst in the homogeneous phase establishes that, rather surprisingly, the activity of the supported catalyst can be greater than that of the homogeneous homologue.

The invention therefore also relates to a method of catalysis, notably applied to catalytic hydrogenations, utilising the catalysts as defined above.

The activity of the catalysts studied has been measured in the examples in conventional manner by the "rotation number" (RN) which defines the number of molecules converted by the catalytic reaction for a catalytically active site and per second, under standardised conditions.

The catalysts obtained can naturally be easily recovered after the catalytic tests, in the heterogeneous phase. They can then be reused to catalyse, for example, the hydrogenation of a new charge of olefines, this operation being repeatable numerous times without their activity therein being appreciably lowered.

EXAMPLE 1

This example serves, in the following, as an element for comparison with the prior art constituted by catalysis in homogeneous phase by transition metal coordination complexes in solution in the reaction medium. It must be noted the start, that generally, catalysts in solution are more active than catalysts fixed on a support. The advantages of the latter, as we have seen, are situated in another domain and relate essentially to questions of economy.

100 mg of the complex Cl Rh [P(C$_6$H$_5$)$_3$]$_3$ noted as C$_0$, are introduced into a round bottom flask with 30 cc of purified benzene. After equilibrating under hydrogen for one hour, 1 cm$^3$ of olefine is injected and the initial reaction speed is measured by consumed hydrogen volumetry. The temperature is regulated to 20° C. by the circulation of water. The mixture is stirred by a magnetic bar. The measured rotation numbers are the following:

| N. R. (s$^{-1}$) | Hexene-1 | Cyclohexene | α-pinene |
|---|---|---|---|
| C$_0$ | 0.055 | 0.011 | 0.0017 |

Example 2 - Preparation of the double support (mineral support) - (polyphenylsiloxane).

1,000 parts by weight of phenyl-trichlorosilane are placed in solution in 1,500 parts of ether, the hydrolysis being then effected with 600 parts of water. A phenyl-silanetriol is then formed which is condensed on itself. It is then washed until neutrality, then taken up by 1,600 parts of benzene, the solution obtained being subjected to distillation to eliminate hydrochloric acid, water, ether and a portion of the benzene. The preparation is completed by stoving at 120° C., at which temperature the product called "benzene collodion" is liquid. It solidifies towards 80° C. It is recovered after crushing.

This collodion is then dissolved in benzene. Powdered silica is suspended in the solution, in the proportion of 100 g of silica to 12 g of collodion. The solvent is then evaporated at the boiling point of benzene, the reaction vessel being kept in constant rotation throughout the operation to avoid agglomerations. The temperature is then brought to about 270° C. for 1 to 2 hours, still with stirring. After cooling, the double support which results is then collected.

Example 3 - Chloromethylation of the silica-polysiloxane double support

The silica prepared as in Example 2 is then suspended in 650 ml of dichlorobenzene. To the suspension 100 ml of chloromethyl ether and 20 g of zinc chloride are added. The mixture is brought to 60° C. for 5 hours. The reaction is stopped with methanol. The product is recovered by filtration and washing until the washings are neutral. Titration of the chlorine gives a chlorine content corresponding, on the average, to 0.33 chloromethyl groups per aromatic nucleus. Note - By varying the chloromethyl group content of the supports and, consequently, the coordination groups, it is possible to direct the preparation to the obtaining of complex catalysts of which the methyl is bound to the polysiloxane support by at least two coordinates. One then has complexes of the chelate type.

EXAMPLE 4 - Preparation of a coordinate-bearing double support

For this step, the reactant which constitutes lithiated diphenyl-phosphine is first prepared by causing 60 ml of monochlorodiphenyl-phosphine to react with 9 g of metallic lithium in 300 ml of purified tetrahydrofurane and for 12 hours. The solution obtained is filtered before use, to eliminate solid residue (lithium chloride, excess lithium).

The chloromethylated double support prepared as in Example 3 is suspended in purified benzene. To this suspension is added lithiated diphenyl-phosphine, in sufficient amount to obtain a persistent deep red color, characteristic of the obtain a persistent deep red color, characteristic of the (C$_6$H$_5$)$_2$P$^-$ anion. The products are then washed with ethanol and dried.

EXAMPLE 5

A rhodium based supported complex catalyst, C$_1$, is prepared by causing 5.6 g of silica-polysiloxane-phosphine support, prepared as in Example 4, and bearing about 3 × 10$^{-3}$ mole of phosphine, to react with 0.73 g of the complex C$_0$ in 70 cm$^3$ of purified benzene. The mixture is kept under nitrogen for 15 days. The product is recovered by filtration and washing. Analysis shows that it contains 4 × 10$^{-4}$ mole of complex.

The product C$_1$ obtained in this manner, used under identical conditions to those of Example 1, gives the following results:

| N. R. (s$^{-1}$) | Hexene-1 | Cyclohexene | α-pinene |
|---|---|---|---|
| C$_1$ | 0.021 | 0.0069 | 0.0031 |

EXAMPLE 6

The catalytic charges C$_0$ and C$_1$ of Example 1 and 5, before use, are activated by leaving them for 24 hours in the presence of hydrogen. Catalysis trails were then carried out in identical manner. The results are, in this case:

| N. R. (s$^{-1}$) | Hexene-1 | Cyclohexene | α-pinene |
|---|---|---|---|
| C$_0$ | 0.062 | 0.034 | 0.0090 |
| C$_1$ | 0.096 | 0.080 | not tested |

The remarkable result obtained with cyclohexene is noted.

EXAMPLE 7

In this Example, the permanent catalytic activity of a charge $C_1$ is shown. For this, this charge serves for the hydrogenation of 1 cm³ of hexene-1, for which reaction the rotation number found is of the order of 0.090 s⁻¹. After this operation, the charges recovered and reused under the same conditions six times. On the seventh operation, a rotation number of 0.095 s⁻¹, hence unchanged, was still found.

EXAMPLE 8

A catalytic charge $C_2$ is prepared in the following manner:

1 g of the salt Rh Cl₃, 3 H₂O is placed in 120 cm³ of purified ethanol with ethylene bubbling therethrough for 12 hours. The product obtained, of the formula [Rh Cl (C₂H₄)₂₋]₂, is added to an ethanol suspension of 30 of silica-polyphenylsiloxane-phosphine support, containing about 2 × 10⁻² mole of phosphine. The mixture is kept under stirring for 12 hours, then filtered and washed. The whole of the preparation is effected under a nitrogen atmosphere. The charge $C_2$ contains about 6 mg of Rh per gram of charge.

A catalytic charge $C_3$ is prepared by placing 0.609 g of the silica-polyphenylsiloxane-phosphine support in contact with 0.06 g of the salt Rh Cl₃, 3 H₂O, the whole being in purified ethanol under nitrogen, with stirring and for 24 hours. The reaction is complete.

For these two charges, used under the conditions described in Example 1, the following rotation numbers were found:

| N. R. (s⁻¹) | Hexene-1 | Cyclohexene | α-pinene |
|---|---|---|---|
| $C_2$ | 0.034 | 0.0034 | 0.0025 |
| $C_3$ | 0.0017 | 0.0034 | 0.0037 |

EXAMPLE 9

In this example, samples of the charges $C_2$ and $C_3$ were preserved for 8 weeks under hydrogen before their use. In the course of this period, the charges absorbed a quantity of hydrogen three times that necessary for saturating each complex with two hydrogen atoms.

The samples were then used under the same conditions as Example 1. The following results were obtained:

| N. R. (s⁻¹) | Hexene-1 | Cyclohexene | α-pinene |
|---|---|---|---|
| $C_2$ | 0.076 | 0.043 | 0.0092 |
| $C_3$ | 0.091 | 0.064 | 0.0106 |

The improvement in performance is hence very substantial.

EXAMPLE 10

A catalyst based on a complex of molybdenum is prepared by placing 1 g of Mo(CO)₆ in 200 cm³ of absolute ethanol, by iradiating the mixture by means of a mercury lamp (366 nm). The compound obtained, of formula Mo(CO)₅-ethanol, is then placed in contact with 1 g of silica-poliphenylsiloxane-phosphine support, containing 2 × 10⁻⁴ mole of phosphine. The mixture was kept under stirring for 12 hours to permit the fixing of the complex to the support.

By spectral analysis, it was shown that the fixing of the molybdenum complex on the support brings into play one or two phosphines and the second mode of fixing is favoured by raising the temperature.

In the following Examples, catalysts supported only by a soluble or insoluble polysiloxane were prepared.

EXAMPLE 11

A catalytic charge $C_6$ is prepared, by treating 5.92 g of polyphenylsiloxane with 200 cm³ of chloromethyl ether in the presence of 1.4 g of zinc chloride and for 2 hours. The product thus obtained is treated with a solution of lithiated phosphine. Placed in the presence of Cramer complex, RH Cl (C₂H₄)₂, the polyphenylsiloxane fixes 0.048 g of rhodium.

The solid sample obtained, after activation for 1 hour under hydrogen is used, under the conditions of Example 1, for the hydrogenation of hexene-1. The rotation number of the catalyst $C_6$ is 0.035 s⁻¹.

EXAMPLE 12

In this example, the starting material is benzene collodion whose preparation is indicated above in Example 2.

5.6 g of this product was treated with 1.6 g of chloromethyl-dimethylchlorosilane at room temperature. In this way it is possible to fix a labile halogen on the polysiloxane without risk of destroying the polymer. The product is precipitated in heptane. 1.5 g of the precipitate is treated with a solution of diphenyl-phosphine-lithium until there is a persistent coloration of the solution. Again, the product is precipitated in heptane, and it is reacted with a solution of Rh Cl (C₂H₄)₂ in benzene. Then two products are recovered of which one is soluble and the other insoluble.

The two products, after activation for 48 hours under hydrogen, are used, as in Example 1, for the hydrogenation of hexene. The rotation numbers obtained are:

| N. R. (s⁻¹) | Hexene-1 |
|---|---|
| $C_5$ soluble | 0.009 |
| $C_5$ insoluble | 0.011 |

EXAMPLE 13

In this example the polysiloxane support is constituted by octaphenyl-hexacyclosilsesquioxane. 5.642 g of this product are treated with 100 ml of chloromethyl ether playing also the role of solvent, in the presence of 2.182 g of zinc chloride, for 2 hours at 60° C. The reaction is stopped with methanol. The product precipitated is recovered by filtration. It is insoluble in the usual solvents. Tritration shows the presence of about 1 chloromethyl group per octaphenylhexacyclosilsesquioxane. This product is reacted with the lithiated diphenylphosphine. The product bearing phosphine coordinates is made to react with the Co complex in the proportion respectively of 7.85 g and 1.24 g in benzene.

The exchange reaction is maintained for 5 days under 0.138 g of charge $C_6$ is activated with hydrogen for 1 hour.

The activated catalyst is used for the hydrogenation of hexene-1. A rotation number of 0.012 s⁻¹, is found.

EXAMPLE 14

The catalytic charges $C_0$, $C_1$ and $C_2$ were tested as in Example 1, but by varying the operational conditions.

To obtain the best results for these charges, operations were carried out with vigorous stirring. These conditions were realised in a vertical tubular reactor, fixed at its top, engaged in a female receiver, mounted excentrically on a motor, at its base. An inner blade breaks the vortex formed by the catalyst-solvent suspension. Besides the economic advantages already indicated, the new catalysts have, under these reaction conditions, an activity which is greater than that of the soluble catalytic charges, described in Example 1:

| NR (s$^{-1}$) | Hexene-1 | Cyclohexene | α-pinene | t-stilbene |
|---|---|---|---|---|
| $C_0$ | 0.5 | 0.4 | 0.07 | 0.01 |
| $C_1$ | 20.3 | not tested | not tested | not tested |
| $C_2$ | 22.7 | 13.6 | 1.03 | 0.52 |

EXAMPLE 15

A catalytic charge $C_7$ was prepared in the following manner:

20 g of phenyltrichlorosilan were dissolved in 100 cm$^3$ of chloromethyl ether; to the medium 0.2 g of zinc chloride is added and is brought to 60° C. for 5 hours. It is then cooled to 0° C. and, whilst maintaining this temperature, 30 cm$^3$ of water are added to the medium. The product is taken up with ethyl ether, and a solvent exchange is effected with the benzene. The prepolymer obtained contains 10 to 15% by weight of chlorine. The reaction with a lithiated phosphine, as in Example 4, then with the diethylenic complex, according to the method described in Example 8, leads to the obtaining of a catalytic charge whose activity has been tested in the hydrogenation of hexene-1 reaction.

| NR (s$^{-1}$) | Hexene-1 |
|---|---|
| $C_7$ | 5 |

EXAMPLE 16

The chloromethyl prepolymer obtained in Example 15 is fixed on glass fiber. 7.5 g of glass fiber are treated with 1.5 g of chloromethyl prepolymer in 40 cm$^3$ of benzene. After slight evaporation, the mixture is brought to 270° C. to obtain the fixing. The process of obtaining the charge $C_2$ is then taken up again. The charge $C_8$ thus obtained is tested in suspension in ehtanol.

| NR (s$^{-1}$) | Hexene-1 |
|---|---|
| $C_8$ | 15 |

EXAMPLE 17

A catalytic charge $C_9$ is prepared in the following manner:

1 g of Rh Cl$_3$, 3 H$_2$O is treated to dry at 80° C. by a current of CO.

During the first hours, the water is driven off, then the dicarbonyl complex sublimes in beautiful red needles soluble in ethanol.

The complex obtained of formula (Rh Cl (CO)$_2$)$_2$ is then fixed on the silica-polyphenylsiloxane phosphine support under the same conditions as the compound (Rh Cl (C$_2$H$_4$)$_2$.

The charge $C_9$ is used under the conditions fixed in Example 14. The results are as follows:

| NR (s$^{-1}$) | Hexene-1 |
|---|---|
| $C_9$ | 24.5 |

EXAMPLE 18

A nickel based catalyst is prepared from 1.024 g of silica-polyphenylsiloxane-phosphine support containing 0.06 × 10$^{-3}$ mole of phosphorus. The support is suspended in 77 g of toluene to which 0.6 × 10$^{-3}$ mole of nickel acetyl-acetonate and 4.8 × 10$^{-3}$ mole of Al$_2$(C$_2$H$_4$)$_3$ Cl$_3$ are added, so that the ratios Ni/P/Al are respectively 10/1/80.

A large amount of Ni in the colloidal state is obtained, which is separated from the solid catalyst by filtration on a metal grid.

The solid catalyst is then resuspended in 77 g of toluene and the solution is saturated with propene at the temperature of 20° C. An amount of Al$_2$(C$_2$H)$_3$ Cl$_3$ identical with the preceding one is added to the medium with stirring.

After 1 hour, the mixture is studied by gas chromatography. The conversion of the propene is 70%.

The solid catalyst is also compared with a homogeneous catalyst processed under the same conditions and such that the ratios Ni (nickel-acetyl-acetonate)/P(triphenylphosphine)/Al (aluminum sesquichloride) = 1/5/10. The results of catalytic hydrogenation of various olefines are as follows:

| | Hexene-1 | Hexene-2 | Hexene-3 | Methyl-pentene |
|---|---|---|---|---|
| Homogeneous catalyst | 19 | 8 | 66 | 5 |
| Supported catalyst | 29 | 3 | 4 | 36 |

EXAMPLE 19

A hydroformylation catalyst is obtained in the following manner:

0.24 g of Rh Cl$_3$, 3H$_2$O are treated with ethylene as described in Example 8. The product obtained is added to an ethanol suspension of 10 g of silica-polyphenylsiloxane-phosphine support. The mixture is then brought to boiling and 1 ml of formic aldehyde in ethanol solution is then added. 15 minutes later, 1 g of sodium borohydride is added to the suspension under reflux. The product $C_{10}$ thus obtained is separated.

1 g of the $C_{10}$ product is then charged with 2 ml of pentene-1 and 20 ml of benzene. This mixture is subjected for 4 hours and with stirring to the bubbling of a CO + H$_2$ mixture.

Ratio CO/H$_2$ = 1/1;

Flow rate 100 cm$^3$ per minute of gas at atmospheric pressure.

The yield of the reaction is 1% with also traces of hexanol.

We claim:

1. In a catalyst comprising a catalytic metal of a coordination complex, said coordination complex being bound onto a solid insoluble support by means of at least one of its coordinates, said coordinates being one of the group consisting of amino, carbonyl, cyano, halogen, diene, cyclodiene, stibine, arsine and phosphine, the improvement wherein the support is covered at least partially by a polysiloxane bearing an organic group, said coordination complex being bound to said polysiloxane through said organic group.

2. Catalyst according to claim 1, wherein the solid insoluble support is formed of silica, a silica-based glass, a silico-aluminate or alumina.

3. Catalyst according to claim 1, wherein the polysiloxane is a polyphenylsiloxane and the coordinates binding the coordination complex to the support are borne by substituents of the phenyl nuclei of the polyphenylsiloxane.

4. Catalyst according to claim 1, wherein the polysiloxane used has an average molecular weight comprised between about 20,000 and 500,000.

5. A catalyst according to claim 1, wherein the solid insoluble support is a mineral material containing a hydroxyl group.

6. Catalyst according to claim 1, wherein the polysiloxane is a polyphenylsiloxane.

7. Catalyst according to claim 5, wherein the ratio by weight of mineral material to polysiloxane is comprised between 100 and 1.

8. A catalyst according to claim 1, wherein the catalytic metal of the coordination complex is a transition metal of the IV, V, VI or VII group of the Periodic Table.

9. A catalyst according to claim 1, wherein the polysiloxane bearing organic group is a "ladder" polysiloxane corresponding to the main structure

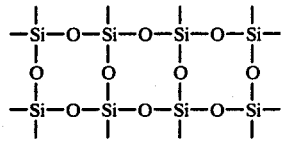

10. Catalyst according to claim 9, wherein the ladder polysiloxane is a polyphenylsiloxane corresponding to the structure

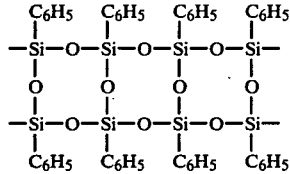

11. Catalyst according to claim 10, wherein the catalytic metal complex is RhCl[P(C6H5)3]3, at least one phosphine coordinate being bound to the phenyl nuclei of the polyphenylsiloxane.

12. Catalyst according to claim 5, wherein the catalytic metal of the coordination complex is a transition metal of group VIII of the Periodic Table.

13. Catalyst according to claim 10, wherein the catalytic metal of the coordination complex is a transition metal of group VIII of the Periodic Table.

14. Catalyst according to claim 12, wherein the polysiloxane used has an average molecular weight between about 20,000 and 500,000.

15. Process for the preparation of a solid, insoluble, supported catalyst comprising a coordination complex of a catalytic transition metal linked to a polysiloxane compound through at least one coordinate of said complex, characterised in that:

polymerisation of a siloxane or of a prepolymer formed from this siloxane is effected in the midst of a liquid phase or in solution, in contact with a mineral support;

on the polysiloxane are fixed groups which subsequently will form coordinates of the metallic complex obtained;

a solution of a metallic complex is reacted with the polysiloxane thus obtained and the reaction is prolonged for sufficient time for equilibrium to be practically established in the reaction of the exchange or the displacement of the metal complex coordinates in solution by those borne by the polysiloxane.

16. Process for the preparation of a solid, insoluble, supported catalyst comprising a coordination complex of a catalytic transition metal linked to a polysiloxane compound, characterised in that:

polymerisation of a siloxane or of a prepolymer formed from this siloxane is effected in the midst of a liquid phase or in solution, in contact with a mineral solid support of silica, silica-based glass, silico-aluminate or alumina;

on the fixed polysiloxane obtained, labile halogen bearer groups are fixed;

the thus transformed polysiloxane is reacted with an alkali metal compound of phosphine, arsine or stilbene; and a reaction of exchange or of displacement between the phosphine, arsine or stilbene groups borne by the polysiloxane and the coordination groups of a coordination complex of nickel, titanium, rhodium, ruthenium or palladium is carried out.

17. A process according to claim 15, wherein the polysiloxane polymerized is a phenylsiloxane, the mineral support is silica, a silica-based glass, a silico-aluminate or alumina and the metal of the complex is nickel, titanium, rhodium, ruthenium or palladium.

* * * * *

UNITED STATES PATENT AND TRADEMARK OFFICE
CERTIFICATE OF CORRECTION

PATENT NO. : 4,157,313
DATED : June 5, 1979
INVENTOR(S) : JEAN CONAN, MARIE-FRANCE LLAURO NEE DARRICADES, MICHEL BARTHOLIN, AND ALAIN GUYOT It is certified that error appears in the above-identified patent and that said Letters Patent are hereby corrected as shown below:

Column 8, line 33, delete "characteristic of the obtain a persistent deep red color"

Column 10, after line 60, insert the following:

-- nitrogen. The product recovered fixed 0.34 g of complex. --

Signed and Sealed this

Tenth Day of June 1980

[SEAL]

Attest:

SIDNEY A. DIAMOND

Attesting Officer

Commissioner of Patents and Trademarks

UNITED STATES PATENT AND TRADEMARK OFFICE
CERTIFICATE OF CORRECTION

PATENT NO. : 4,157,313
DATED : JUNE 5, 1979
INVENTOR(S) : JEAN CONAN, MARIE-FRANCE LLAURO NÉE DERRICADES, MICHEL BARTHOLIN, ALAIN GUYOT

It is certified that error appears in the above-identified patent and that said Letters Patent are hereby corrected as shown below:

Column 5, line 20, "$CH_3-C-CH_2Cl$" should read -- $CH_3-O-CH_2Cl$ --.

Column 6, line 35, "$XP(C_6H_5)_3$" should read -- $xP(C_6H_5)_3$ --.

Signed and Sealed this

Twentieth Day of January 1981

[SEAL]

Attest:

RENE D. TEGTMEYER

Attesting Officer

Acting Commissioner of Patents and Trademarks